(12) United States Patent
Roylance et al.

(10) Patent No.: US 6,511,563 B2
(45) Date of Patent: Jan. 28, 2003

(54) DEVICE FOR ULTRASONICALLY CONSOLIDATING FIBER REINFORCED COMPOSITE STRUCTURES

(75) Inventors: Margaret E. Roylance, West Newton, MA (US); John C. Player, Wayland, MA (US); Victor Leemon, Foxboro, MA (US); Douglas T. Thomson, Hanover, MA (US)

(73) Assignee: Foster-Miller, Inc., Waltham, MA (US)

( * ) Notice: Subject to any disclaimer, the term of this patent is extended or adjusted under 35 U.S.C. 154(b) by 99 days.

(21) Appl. No.: 09/755,422

(22) Filed: Jan. 5, 2001

(65) Prior Publication Data

US 2001/0011570 A1 Aug. 9, 2001

Related U.S. Application Data

(63) Continuation-in-part of application No. 09/686,635, filed on Oct. 11, 2000, which is a continuation of application No. 08/394,737, filed on Feb. 27, 1995, now abandoned, which is a continuation-in-part of application No. 08/280,303, filed on Jul. 26, 1994, now abandoned, which is a continuation of application No. 08/002,700, filed on Jan. 11, 1993, now abandoned, which is a continuation of application No. 07/662,917, filed on Mar. 1, 1991, now abandoned.

(51) Int. Cl.[7] .............................................. B32B 31/16
(52) U.S. Cl. ................ 156/73.1; 156/308.2; 156/580.1; 156/580.2
(58) Field of Search ............................ 156/73.1, 73.4, 156/308.2, 309.6, 324, 580.1, 580.2; 264/442, 443, 444

(56) References Cited

U.S. PATENT DOCUMENTS 4,704,172 A * 11/1987 Katz .......................... 156/73.2
4,713,131 A    12/1987 Obeda ....................... 156/73.1
5,039,371 A     8/1991 Cremens et al. ............ 156/382

FOREIGN PATENT DOCUMENTS

| DE | 3911634 | 10/1990 |
| EP | 0007558 | 2/1980 |
| JP | 0004490 | 4/1963 |

OTHER PUBLICATIONS

Branson Sonic Power Corporation, Ultrasonic Plastics Assembly (1979).

Sonic Assisted Process Development, Interim Technical Report, "Contract No. F 33615–86C—5041, Martin Marietta Baltimore for Material Laboratory Air Force Wright labs." (Mar. 1987).

Vijay K. Stokes, Joining Methods for Plastic and Plastic Compoisites: An Overview, GE Corporate Research and Development Schenectady, New York.

T. G. Gutowski, Ultrasonic Welding for Thermoplastic Composites, ANTEC 507–510 (1989).

33rd International SAMPE Symposium, Ultrasonic Welding of Advanced Thermoplastic Composites (Mar. 7–10, 1988).

* cited by examiner

Primary Examiner—James Sells
(74) Attorney, Agent, or Firm—Iandiorio & Teska

(57) ABSTRACT

A bi-directional device for ultrasonically consolidating a fiber reinforced composite structure including a horn which can be angled relative to the composite structure. The horn includes a tip at the distal end of the horn which terminates in a rounded face. The rounded face of the horn contacts the composite structure enabling the horn to be driven bi-directionally over the composite structure at an angle.

28 Claims, 11 Drawing Sheets

STEP HORN

EXPONENTIAL HORN

CATENOIDAL HORN

RECTANGULAR HORN

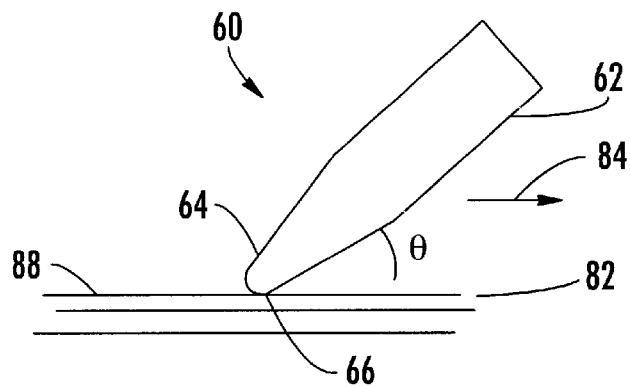
FIG. 9.
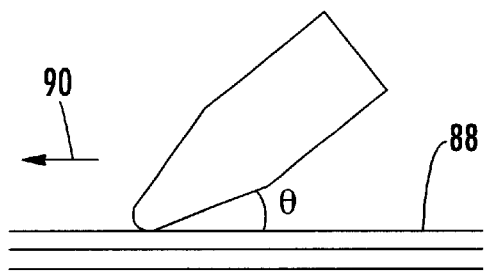
FIG. 10.
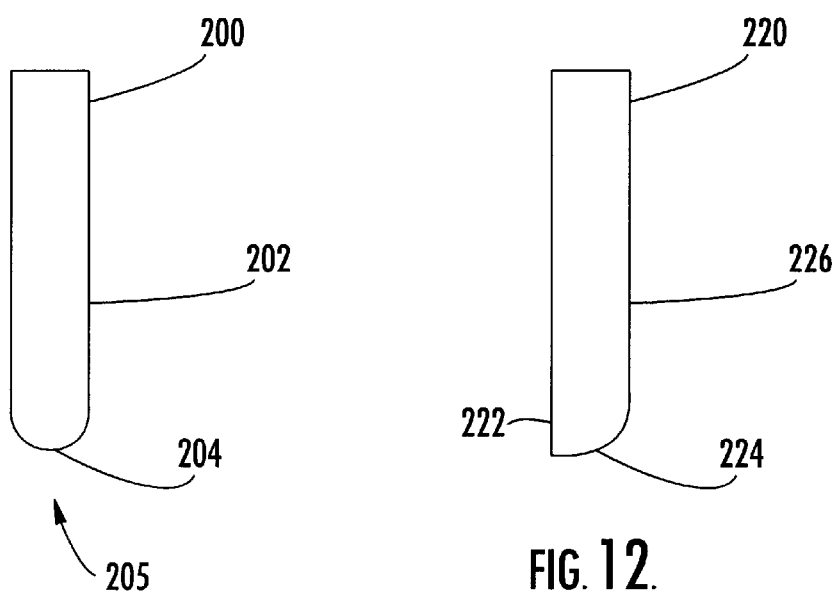
FIG. 11.
FIG. 12.

DEVICE FOR ULTRASONICALLY CONSOLIDATING FIBER REINFORCED COMPOSITE STRUCTURES

RELATED APPLICATIONS

This application is a continuation-in-part application of U.S. application Ser. No. 09/686,635 filed Oct. 11, 2000, which is a continuation of U.S. application Ser. No. 08/394,737 filed Feb. 27, 1995 abandoned which is a continuation-in-part of U.S. application Ser. No. 08/280,303 filed Jul. 26, 1994 abandoned which is a continuation of U.S. application Ser. No. 08/002,700 filed Jan. 11, 1993 abandoned which is a continuation of application Ser. No. 07/662,917 filed Mar. 1, 1991 now abandoned.

FIELD OF THE INVENTION

This invention relates to a bi-directional horn for ultrasonically consolidating a fiber reinforced composite structure.

BACKGROUND OF THE INVENTION

Composite materials are becoming more and more attractive for a wide variety of uses, from aircraft and automobiles to sporting goods and toys, because of their high stiffness and strength-to-weight ratio. A composite material is a combination of fibers in a matrix or resin. Typically, a composite structure is made of a number of layers or plies of such composite materials. Typically, composite materials include a combination of fibers or fibrous tows in a matrix of thermoplastic or thermosetting resin. Dry fabric with unidirectional fibers or fibrous tows or woven fibers is often precombined with resin as a "PREPREG". Examples include carbon, glass or graphite fibers in a resin matrix. The fibers typically comprise more than 35% of the material volume. Dry fabric with unidirectional fibers or fibrous tows or woven fibers can also be precombined with at thermosetting resin. This type of composite, a thermoset composite, generally requires that the fiber/resin plies be laid-up, debulked, and then cured—a process which can take a matter of hours. These composites are contrasted with thermoplastic composites which are generally faster to fabricate because there is no curing involved. The thermoplastic resin infused plies need only be heated to melt the plastic matrix and then pressed together or consolidated to the other plies before cooling. With thermosetting composites, on the other hand, heating to a high enough temperature invokes an exothermic reaction causing the molecules of the resin to cross link. Once this chemical cross linking occurs, the viscosity of the resin cannot be lowered. This is not the case with thermoplastic resins.

As used herein, consolidation means laminating two or more plies together to form a part or structure. Good consolidation implies a low level of voids (typically less than 3%) and a shear strength of the ply interfaces after curing which approaches that of the resin matrix.

Heating the plies, to consolidate them however, is troublesome: a number of different heating techniques have been tried but have met with mixed success. Laser heating in the nip between the previous ply and the ply being applied or laid down has not been wholly successful due to the practical problems of applying the energy at the nip. A laser apparatus with all the necessary controls is also quite expensive. Infrared devices, which depend upon radiant heating, suffer from poor heat moduability and can easily damage the composite structure.

Microwave devices suffer similar shortcomings and are potentially hazardous to surrounding personnel as well. A hot shoe technique, which is commercially available, employs a series of massive, heated, iron-like devices. This method relies on conduction through the ply to heat the interface which makes the process a slow one. Because of size and geometry, this method has only been applied to the production of flat panels, thereby restricting its usefulness.

The most evaluated technique presently in use is hot gas heating. In that process, a stream of hot air or gas is aimed into the nip between the new ply (layer or tape or tow) and the substrate and thereafter the new ply is pressed or ironed onto the substrate using a pinch roller or a shoe. While the consolidation levels achieved using this approach are high, the heating is difficult to modulate with respect to rapid changes in the material feed rate. This complicates the practical integration of convective, hot gas heating with standard computer-numerical-control fabrication equipment. Moreover, despite the high consolidation, some reports on the mechanical properties of the resulting composites have been disappointing. This may be due to damage or degrading of the surface of the material at the nip, especially due to the high heat level applied and the large temperature differential (300° C. or more) between the hot gas stream and the melt temperature of the thermoplastic material.

Filament winding, tape placement and tow placement are also common methods for fabricating parts from fiber reinforced composites.

Filament winding involves winding a filament bundle known as a 'tow', to which resin has previously been applied, around a mandrel. Multiple turns around the mandrel are used to build up the required part thickness after which the part is cured in an oven or autoclave.

During winding, thicker parts may require intermediate consolidation or compaction steps known as 'debulks' using heat in conjunction with pressure and/or a vacuum. Thick parts cured without any intermediate debulks often develop fiber wrinkling which degrades the mechanical properties of the cured part.

In tape or tow placement, a robotic head is used to place a narrow prepreg tow or tape (typically 0.125–2 inches in width) against a tool which defines the desired part shape. Multiple layers are placed at different orientations to obtain the required ply construction and part thickness. A combination of downward pressure on the tow, applied by the head, and tack (stickiness of the tow) is required to insure the tow remains in location after placement, particularly when placing a tow on concave portions of the tool.

Usually the tow, and the previously deposited ply layers, are heated to increase the tack prior to placement by the robotic head.

Current tow placement machines use separate mechanisms, placed in close proximity, to apply heat and pressure. Commonly, heat is applied by a jet of hot gas directed onto the tow and pressure is applied by one or more rollers or shoes which ride against the surface of the tow. The levels of consolidation achieved in this manner are such that thick tow or tape placed parts also require intermediate debulking to prevent fiber movement or wrinkling during cure.

One obstacle to consistently achieving higher levels of consolidation with these processes is the difficulty inherent in controlling temperature. Because of the heat capacity present in a hot gas system, the temperature of the gas jet, and hence the heat input to the tow cannot be easily modulated to allow for starts, stops or changes in advance rate of the robotic head.

Intermediate debulking typically involved applying a vacuum bag along with associated bag sealants, vacuum lines, connections, etc. to the layup tool or mandrel, and transfer of the tool from the tow placement machine to an oven or autoclave where it is heated to 180–250° F. and held under vacuum pressure for up to four hours. The part is then returned to the tape placement machine to continue the lay-up process. Current thick parts such as the V-22 spindle and the F-22 pivot shaft require numerous intermediate debulks which adds substantial cost.

A method of applying heat and pressure which achieves high levels of consolidation during tape or tow placement, thus eliminating the need for intermediate debulks, is desired and could result in substantial cost savings. The current invention relates to such method which uses a bi-directional device to generate the heat and pressure required for consolidation. Further, the method has the potential, in certain cases, to replace autoclave curing with curing in an oven. Moreover, the unique design of the bi-directional device of this invention allows the ultrasonic horn to be driven over the laminate bi-directionally while remaining in constant contact to the top surface of the composite.

A bi-directional device utilizing ultrasonic energy to heat the plies is appealing for a number of reasons. Unlike convection (hot gas), conduction (hot shoes/irons), or radiation (infrared), ultrasonic consolidation does not depend upon a thermal driver to effect energy transfer to the composite material. Ultrasonic heating is instantaneously modulatable, and it provides deep, penetrating heating in the polymeric matrix beyond mere surface heating.

Ultrasonic welding has long been used to weld or bond neat (unreinforced) plastics with no or little fiber content. Such welding is done by placing an ultrasonic horn perpendicular to two plastic layers, pressing down on the layers and energizing the horn. Obeda, U.S. Pat. No. 4,713,131, teaches joining large sheets of polypropylene plastic by overlapping the sheets of plastic and welding their edges together using an ultrasonic horn placed between the sheets. Obeda, however, teaches nothing about composite materials.

But, others have attempted to use an ultrasonic horn to fabricate composite parts. See *Joining Methods for Plastic and Plastic Composites: An Overview*, Vijay Stokes, *Polymer Engineering and Science*, Mid-October 1989, Vol. 29, No. 19, p. 1310–1324, specifically pp. 1322–1324, items 168–236. These previous attempts to weld thermoplastic composites during the lamination process used a conventional ultrasonic horn with a flat face disposed perpendicularly with respect to the plies. These techniques have yielded disappointing results because, it is speculated, the presence of the fibers alters the energy transfer in the material. Moreover, these conventional ultrasonic welding techniques set up a compression wavefront in the material which does not transmit well through the material. In 1987, engineers at Martin Marietta attempted to use an ultrasonic horn to consolidate composite resin-fiber plies. The horn was placed on the top of two moving plies to be consolidated in a direction perpendicular to the plies. A range of different pressures, energy levels, and feed rates were tried. The result, however, was not satisfactory: "C-Scan results have shown that attempts to produce consolidated or near-consolidated laminates have not been successful thus far . . . "*Sonic Assisted Process Development*", Interim Technical Report, " contract No. F 33615-86-5041, Martin Marietta Baltimore for Material Laboratory Air Force Wright Labs., March 1987."

Therefore, although ultrasonic horns have been used to weld plastic sheets together and, to some extent, have been successfully used to weld thermoplastics containing up to about 35% filler (such as glass or talc), the state of the art reveals no successful methodology of fabricating fiber reinforced composite structures using an ultrasonic horn to consolidate and further debulk the individual fiber-resin plies.

The applicants hereof then invented a solution: when a conventional flat faced ultrasonic horn was angled and moved relative to the plies, the plies were more fully consolidated. See the application filed by the instant inventive entity on Oct. 11, 2000 which is a continuation of application Ser. No. 08/394,737 filed Feb. 25, 1995 and the application filed by the instant inventive entity on Oct. 19, 2000 which is a continuation-in-part of application Ser. No. 08/394,737 filed Feb. 25, 1995 incorporated herein by this reference.

One potential problem however, is that conventional horns have a square flat face which is difficult to push across the surface of the top most ply. Most conventional horns have a tapered tip leading to flat square face which creates a distinct sharp edge. When the horn is angled to provide consolidation of a fiber reinforced composite structure, the sharp edge of the horn may dig in and gouge the composite structure.

SUMMARY OF THE INVENTION

It is therefore an object of this invention to provide an improved ultrasonic horn for ultrasonically consolidating a fiber reinforced composite structure.

It is a further object of this invention to provide such a horn which can be used in a bi-directional fashion.

It is a further object of this invention to provide such a horn for ultrasonically consolidating a fiber reinforced composite structure which provides a constant contact area over a range of angles between the horn and the plies.

It is a further object of this invention to provide such a horn for ultrasonically consolidating a fiber reinforced composite structure which provides for faster and more efficient consolidation.

It is a further object of this invention to provide such a horn for ultrasonically consolidating a fiber reinforced composite structure which provides a constant contact surface area between the device and the fiber reinforced composite structure.

It is a further object of this invention to provide such a horn for ultrasonically consolidating a fiber reinforced composite structure which reduces hot spots in the horn and the processed material.

It is a further object of this invention to provide such a horn for ultrasonically consolidating a fiber reinforced composite structure which produces a more even heat distribution on the fiber reinforced composite structure.

It is a further object of this invention to provide a method of fabricating a fiber reinforced composite structure which utilizes an improved ultrasonic horn to consolidate the fiber-resin plies of the composite structure.

It is a further object of this invention to provide such a method which utilizes an improved ultrasonic horn and is controllable, instantly modulatable, and which does not require a large thermal differential between the device and the material.

It is a further object of this invention to provide such a method which is much less likely to cause overheating or damage to the material or detract from the consolidation quality.

It is a further object of this invention to provide such a method which applies pressure simultaneously with heat.

It is a further object of this invention to provide such a method which is faster and easier to employ and is less expensive both in execution and in the equipment required, and is extremely energy-efficient.

It is a further object of this invention to provide such a method which eliminates the repeated debulking operations required of the prior art and in which debulking occurs as the plies are laid down.

It is further an object of this invention to provide such a method in which the ultrasonic horn can be used not only to debulk the plies as they are laid down, but which can also advance the chemical reaction of the resin so that it approaches a condition commonly referred to as the 'gelation point' thus making it possible to effect a final cure in an oven instead of in an autoclave.

This invention results from the realization that a truly effective and robust bi-directional device for ultrasonically consolidating a fiber reinforced composite structure can be achieved by providing an ultrasonic horn which includes a tip at the distal end of the horn which terminates in a rounded face that allows the horn to be angled relative to the composite structure. The unique rounded face of the horn contacts the top ply of the fiber reinforced composite structure enabling the horn to be both driven and pulled over the fiber reinforced composite structure.

This invention features a bi-directional device for ultrasonically consolidating a fiber reinforced composite structure including a horn which can be angled relative to the composite structure. The horn also includes a tip at the distal end of the horn, the tip terminating in a rounded face which contacts the composite structure enabling the horn to be driven bi-directionally over the composite structure at an angle.

The bi-directional device in accordance with this invention may include a horn which is a step horn, an exponential horn, a catenoidal horn, or a rectangular horn.

The tip of the horn may include sides which converge toward the rounded face at an angle of between 10° and 40°. The distal end of the tip may be symmetrical, but alternatively, the horn may include a non-rounded portion proximate the face on the distal end of the tip.

This invention also features a method of fabricating a fiber reinforced composite structure. The method includes the steps of assembling a stack of fiber reinforced material plies, engaging an ultrasonic horn including a rounded face with a top surface of the upper most ply such that the rounded face contacts the upper most ply, orienting the horn at an acute angle with respect to the top surface and energizing the horn to induce a shear wave in the plies to heat the plies. A relative motion is provided between the horn and the stack such that the horn can be driven and pulled over the upper most ply to consolidate the plies. The method may further include the step of applying a consolidation force through the horn or proximate the horn by a roller. Preferably, the acute angle of the horn with respect to the top surface is less than or equal to 45 degrees.

The fiber matrix structure may be a thermoplastic polymer-matrix or a thermosetting polymer-matrix.

This invention further features a method of fabricating a fiber reinforced composite structure which includes the steps of assembling a stack of fiber reinforced material plies, engaging an ultrasonic horn with a tip at the distal end of the horn terminating in a rounded face which contacts a top surface of the upper most ply and enables the horn to be driven bi-directionally over the top surface of the upper most ply, orienting the horn at an acute angle with respect to the top surface, and energizing the horn to induce a shear wave in the plies to heat the plies. The horn is driven bi-directionally over the top surface to consolidate the plies.

This invention further features a method of fabricating a thermosetting matrix fiber reinforced composite structure. The method comprises assembling a stack of fiber reinforced thermosetting resin material plies, engaging an ultrasonic horn with a tip at the distal end of the horn terminating in a rounded face which contacts a top surface of the upper most ply and enables the horn to be driven bi-directionally over the top surface of the upper most ply, orienting the horn at an acute angle with respect to the top surface, and energizing the horn to induce a shear wave in the plies to heat the plies. A relative motion is provided between the horn and the stack such that the horn is driven and pulled over the upper most ply to consolidate the plies. The energy level applied by the horn is sufficient to reduce the viscosity of the thermosetting resin to the point where the plies can be debulked but not high enough to fully cross-link the resin so that another ply can be cross-linked to the uppermost ply. Pressure is applied to the plies via the horn and/or a separate roller or shoe to debulk the plies.

The plies of thermosetting material typically have more than 40% fiber by volume. Final curing may take place in an oven or an autoclave. One or more plies may be deposited onto a previously assembled and consolidate stack of plies. Preferably, the method of the subject invention may be used in conjunction with filament winding, tape placement, fiber placement or tow placement or tow placement to deposit and consolidate thermosetting matrix, fiber reinforced composites.

BRIEF DESCRIPTION OF THE DRAWINGS

FIG. 9 is a schematic diagram illustrating how the bi-directional device of the subject invention can be driven over a fiber reinforced composite structure in one direction;

FIG. 10 is a schematic diagram illustrating how the bi-directional device of the subject invention can be driven over a fiber reinforced composite structure in the opposite direction;

FIG. 11 is a schematic side view of another embodiment of the bi-directional device for ultrasonically consolidating a fiber reinforced composite structure in accordance with the subject invention;

FIG. 12 is a schematic side view of yet another embodiment of the bi-directional device for ultrasonically consolidating a fiber reinforced composite structure in accordance with the subject invention;

DISCLOSURE OF THE PREFERRED EMBODIMENT

Figures 1, 1A:
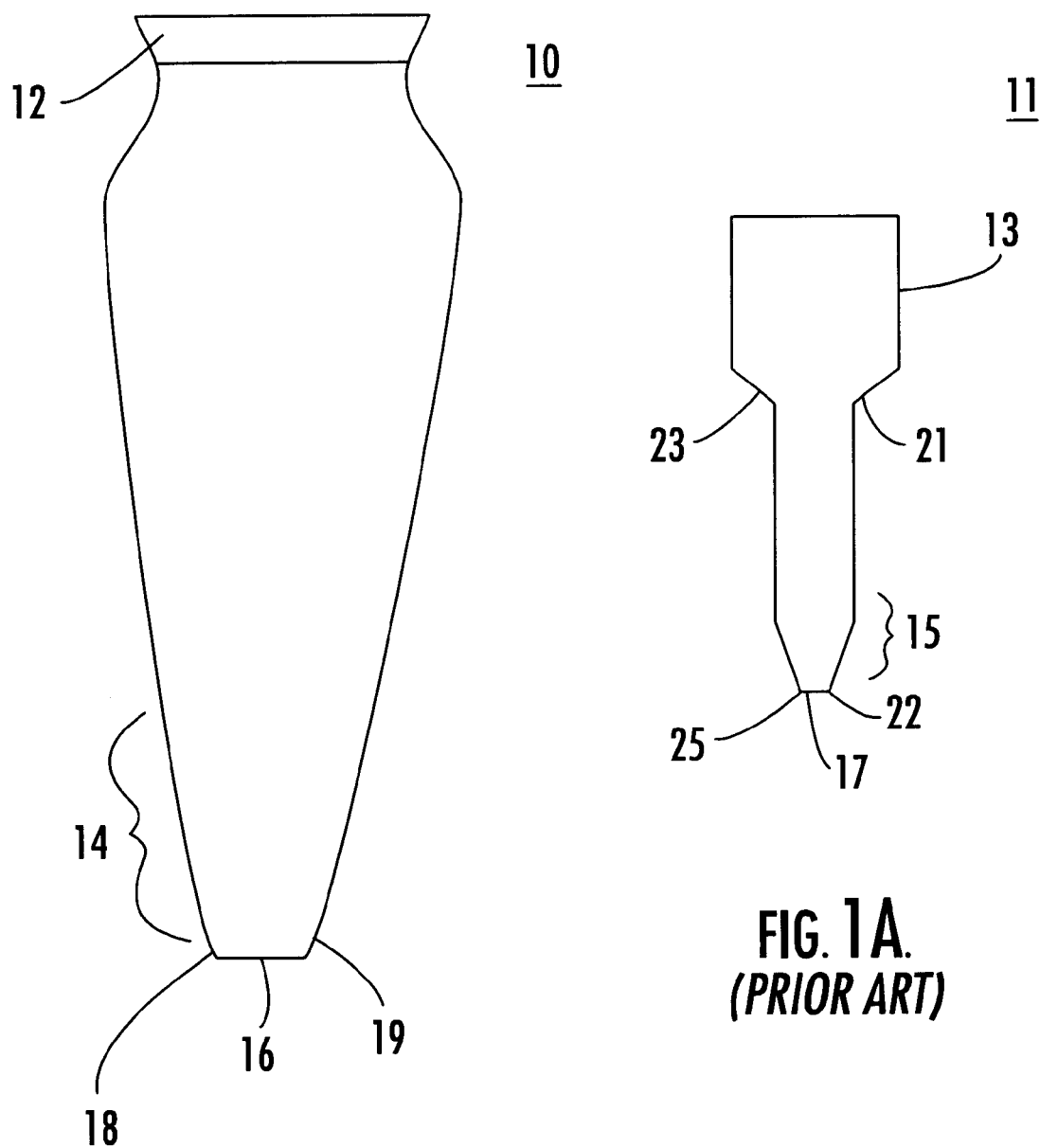
FIG. 1 is a schematic view of typical prior art ultrasonic horn.
FIG. 1A is a schematic view of another typical prior art ultrasonic step horn.

As explained in the Background of the Invention section above, typical prior art ultrasonic horn 10, FIG. 1 includes base 12, tip 14, and square or rectangular flat face 16. The junction of tip 14 and flat square face 16 creates distinct sharp edges 18 and 19. Another prior art ultrasonic horn is step horn 11, FIG. 1A which includes base 13, converging sides 21 and 23, tip 15 and flat face 17. In this design, the junction of tip 15 and flat square face 17 creates distinct sharp edges 22 and 25.

Figure 2:
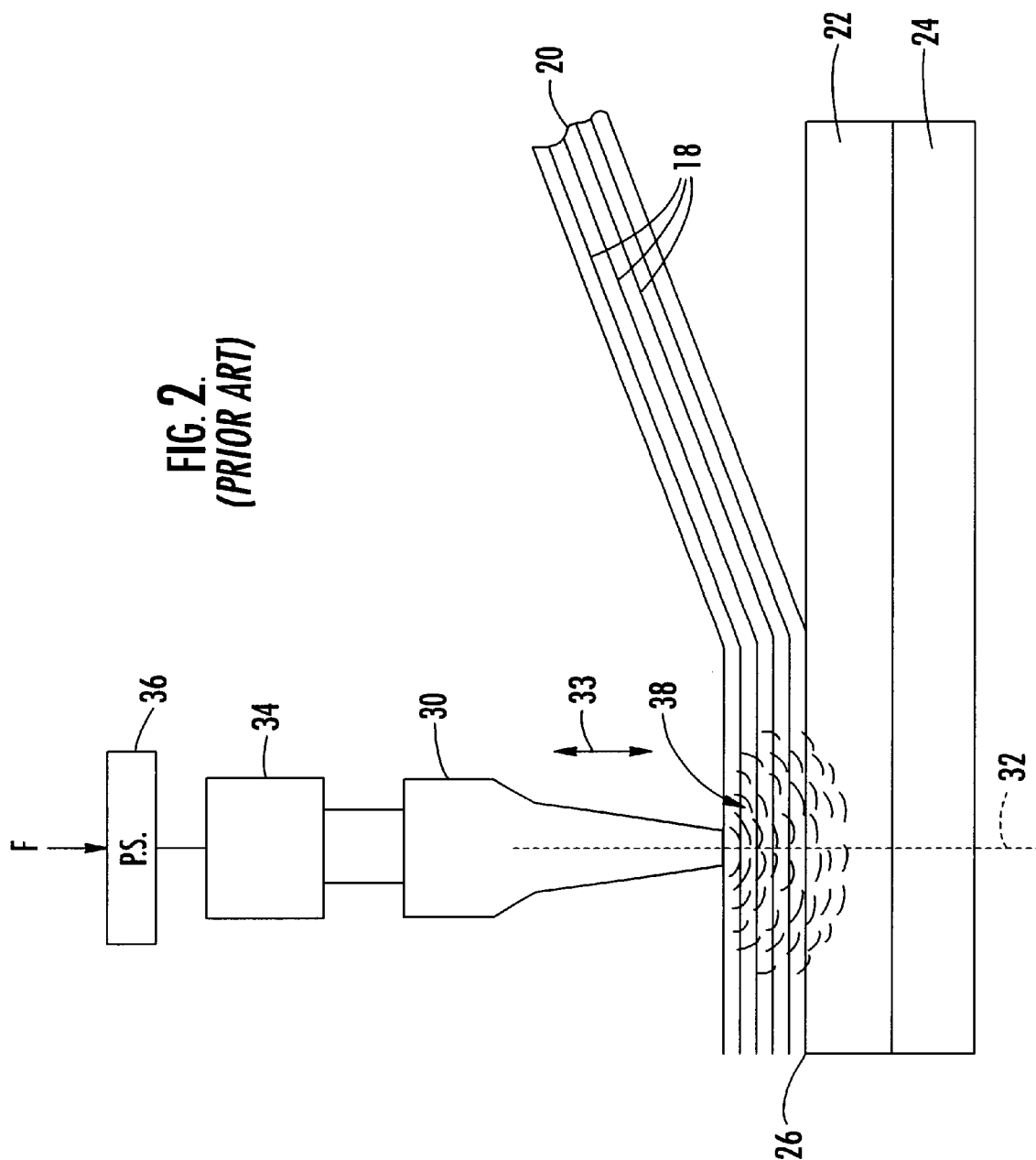
FIG. 2 is a schematic diagram illustrating a prior art ultrasonic horn being used to ultrasonically weld a fiber reinforced composite structure.

In FIG. 2, one polymer matrix, fiber reinforced composite ply 20 (layer, tow, ribbon, or tape) is in the process of being applied to polymer matrix, fiber-reinforced composite plies 22 and 24. The polymer matrix may be a thermoplastic or a thermosetting resin. Ultrasonic energy is applied perpendicular to horn 10 which is vibrated in the direction shown by arrow 33 along its longitudinal axis 32 by ultrasonic transducer 34 driven by power supply 36. Because ultrasonic horn 10 is disposed perpendicular to the plies, the ultrasonic or elastic waves 38 are generally understood to be compression waves 38 which move perpendicularly though ply 20 into ply 22 in order to create sufficient heating to allow bonding to occur at the interface between plies 20 and 22 under a consolidation force F applied directly to horn 10.

As explained in the Background of the Invention above, this prior art technique wherein the ultrasonic horn is placed perpendicular to the plies has met with indifferent success. It is believed this is in part because the fibers in ply 20 affect and dissipate the ultrasonic energy before it can be converted to heat at interface 26 between ply 20 and ply 22. A horn placed perpendicular to the plies did not result in successful consolidation. See, e.g. the Martin Marietta report cited in the Background of the Invention above. Because prior art ultrasonic horns were placed perpendicular to the plies, no consideration was given to the flat square face of a typical prior art horn.

Figure 3:
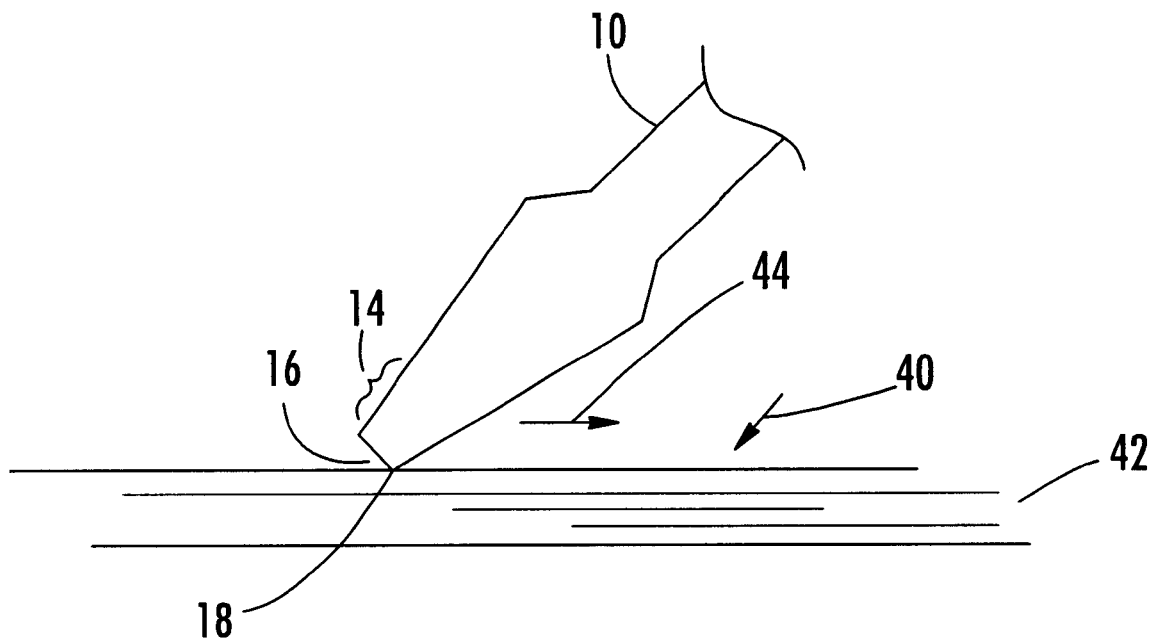
FIG. 3 is a schematic diagram illustrating an angled ultrasonic horn driven over a fiber reinforced composite structure in one direction.

The inventors hereof then achieved great successors by angling ultrasonic horn 10 relative to the plies as shown in FIG. 3. See the application filed by the instant inventive entity on Oct. 11, 2000 which is a continuation of application Ser. No. 08/394,737 filed Feb. 27, 1995 and the application filed by the instant inventive entity on Oct. 19, 2000 which is a continuation-in-part of application Ser. No. 08/394,737 filed Feb. 27, 1995.

Figure 4:
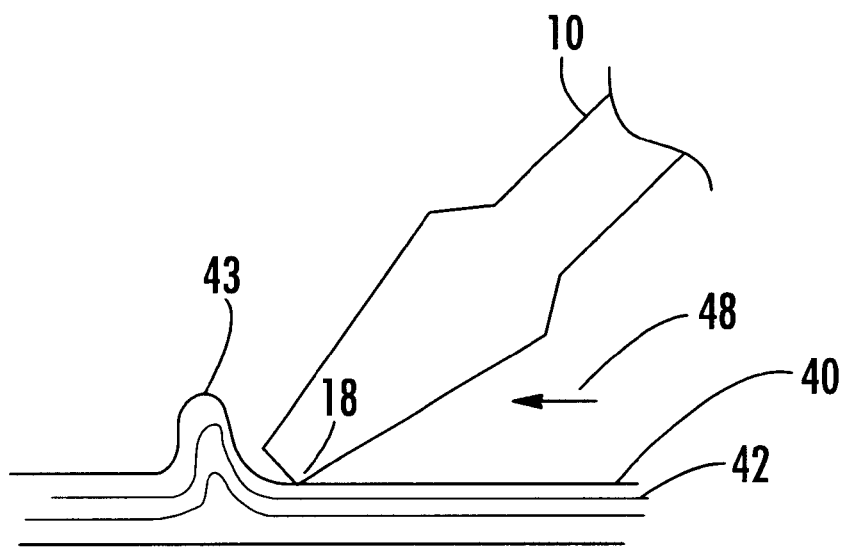
FIG. 4 is a schematic diagram illustrating an angled horn driven over the same fiber reinforced composite structure in the opposite direction.
Figure 5:
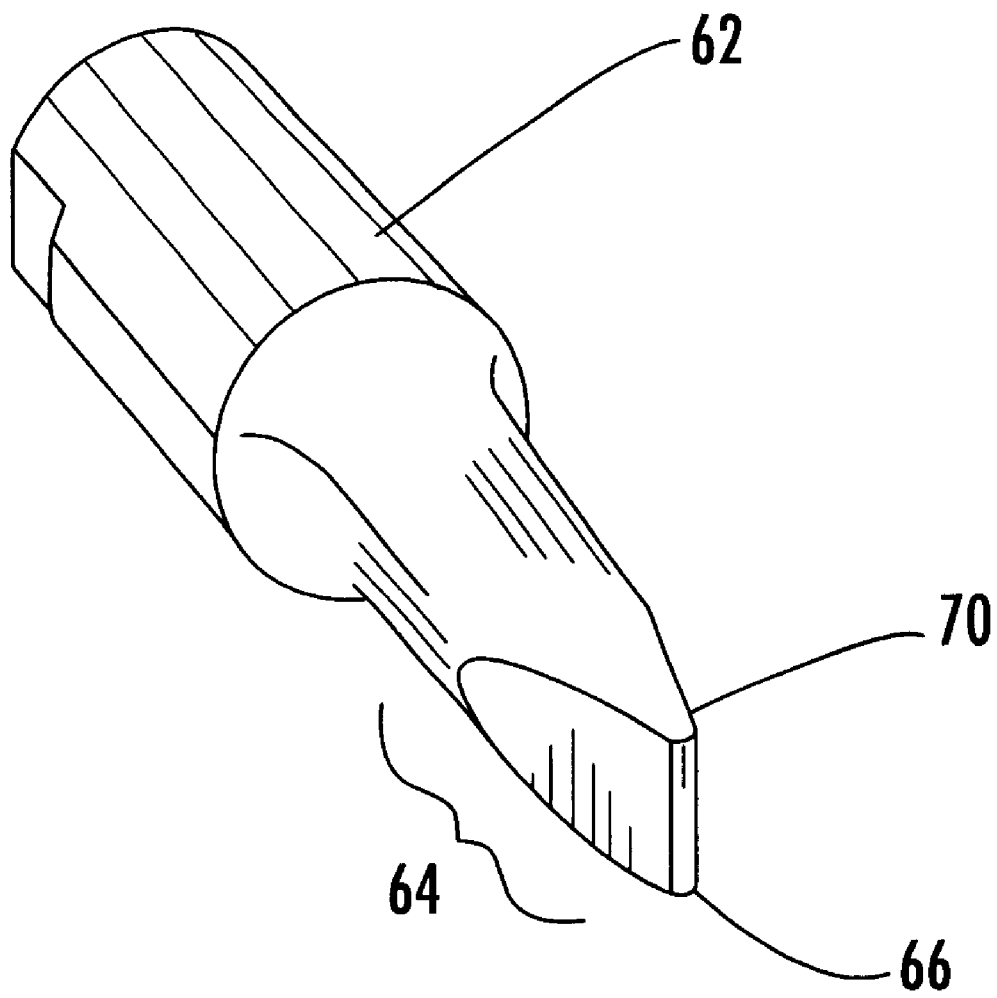
FIG. 5 is a three-dimensional view of one embodiment of the of the bi-directional device for ultrasonically consolidating a fiber reinforced composite structure of the subject invention.

Ultrasonic horn 10, FIG. 3 is drawn along to the right as shown by arrow 44. In order for the consolidation to be effective, ultrasonic horn 10 should remain in constant contact with top surface 40 and provide sufficient force to consolidate fiber reinforced composite structure 42. Because of the structure of prior art horn 10, specifically the square flat face design, the only effective location to apply a sufficient consolidation force is sharp edge 18. Worse, when the direction ultrasonic horn 10 is reversed, or drawn to the left as shown by arrow 48, FIG. 4, sharp edge 18 gouges top surface 40 of fiber reinforced composite structure 42 and creates a build up as shown at 48. The result can damage fiber reinforced composite structure 42. Thus, conventional flat faced horns were typically only moved in one direction relative to the plies being consolidated. In response, in this invention, horn 62, FIG. 5 was engineered so it could be more easily angled relative to the top surface of a fiber reinforced composite structure and be driven bi-directionally. Horn 62 includes tip 64 at distal end 70 which terminates in rounded face 66. Rounded face 66 is the portion of horn 62 which contacts the composite structure and enables horn 62 to be driven bi-directionally over the composite structure.

Figure 6A:
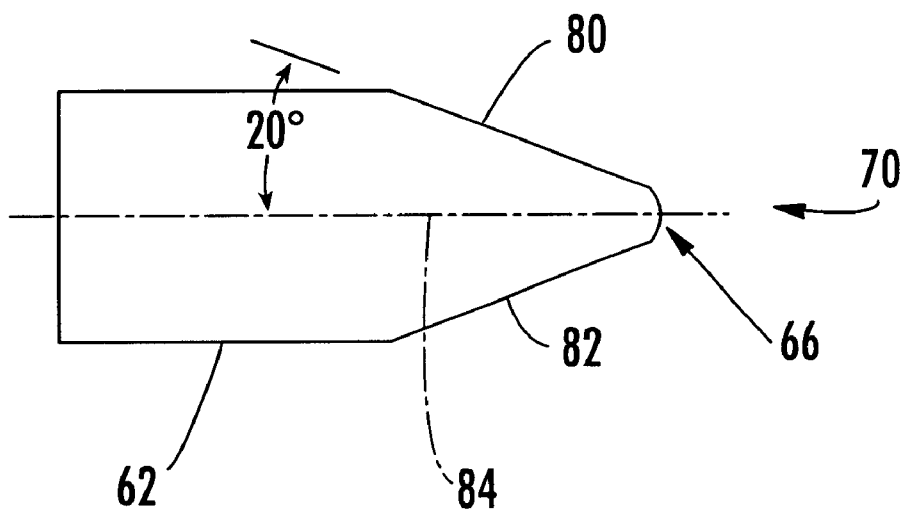
FIGS. 6A–6B are top and side views of the bi-directional device shown in FIG. 5.
Figure 6B:
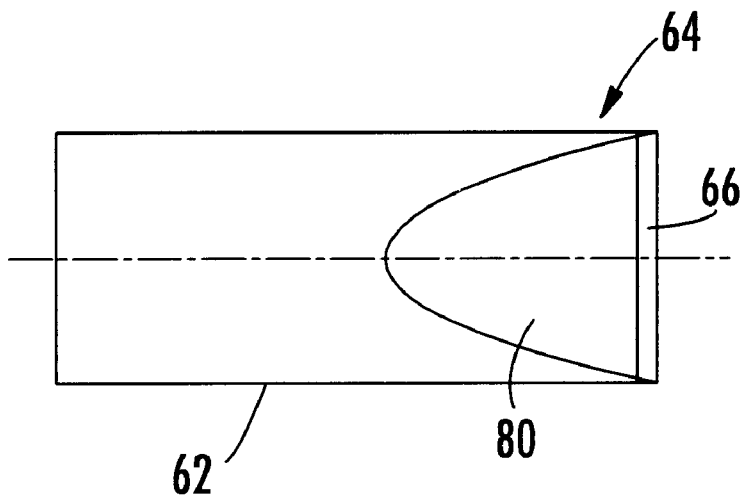

In one preferred embodiment of the subject invention, horn 62, FIGS. 6A and 6B includes sides 80 and 82 which converge at an angle of 20° relative to centerline 84. Ideally the distal end of horn 62 is symmetrical. Tip 64 portion preferably terminates in rounded face 66.

Horn 62 is typically made of titanium or the same materials of conventional ultrasonic horns.

Figure 7A:
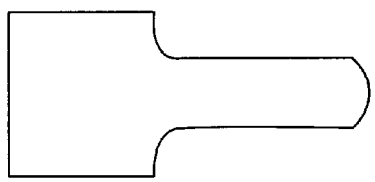
FIGS. 7A–7D are schematic views of other embodiments of the ultrasonic horn of this invention.
Figure 7B:
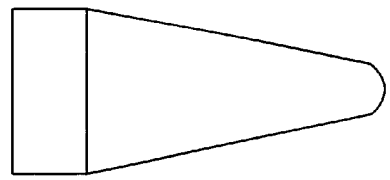
Figure 7C:
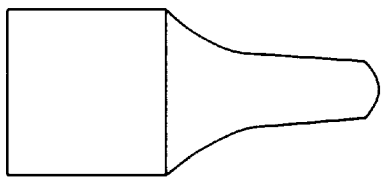
Figure 7D:
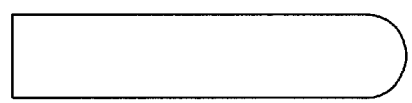

Horn 60 is typically a step horn, FIG. 7A, but may be an exponential horn, FIG. 7B, a catenoidal horn, FIG. 7C, or a rectangular horn, FIG. 7D.

Figure 8:
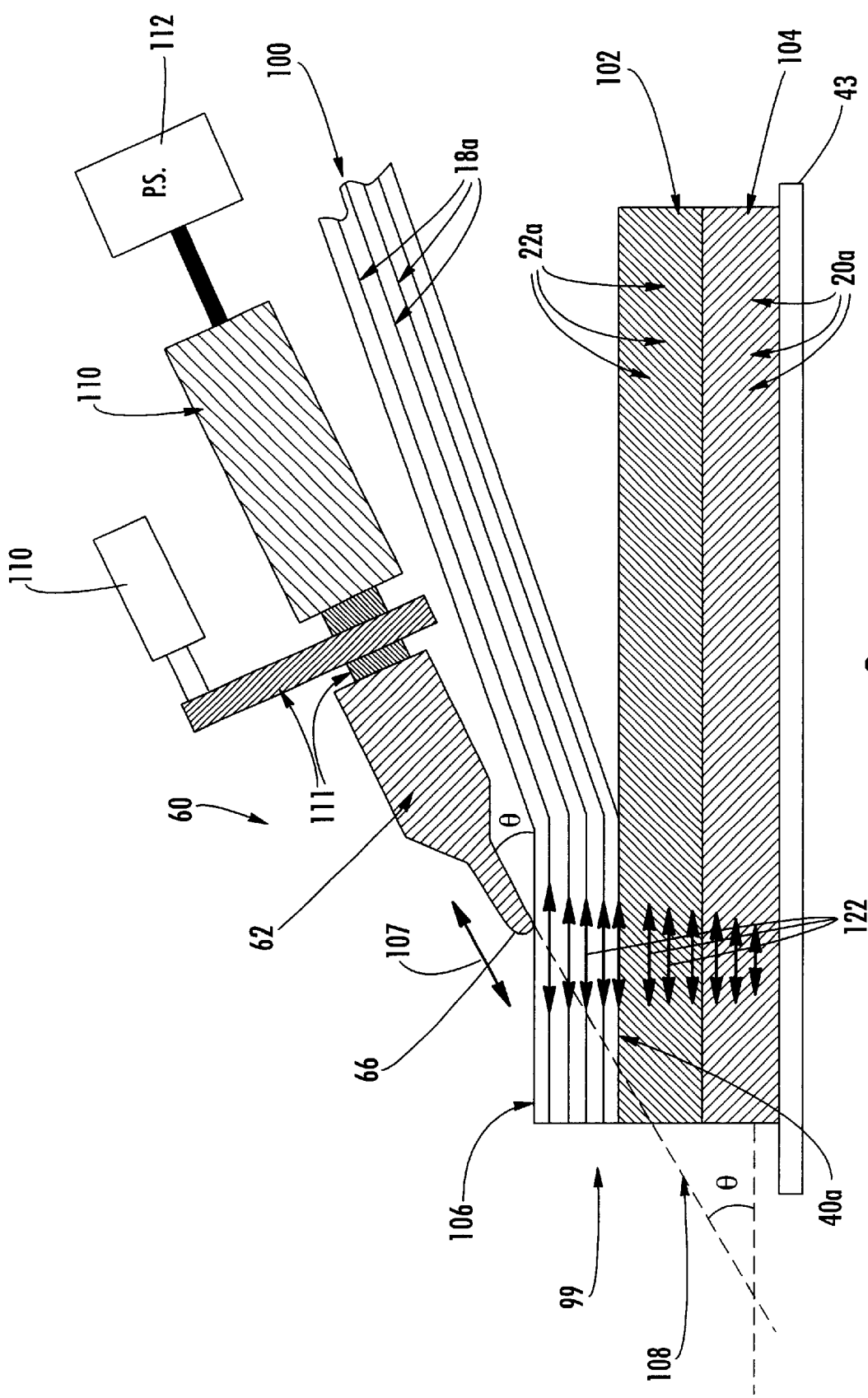
FIG. 8 is a schematic illustration of the bi-directional device of the subject invention ultrasonically laminating a fiber reinforced composite structure with the consolidation force applied though the ultrasonic horn.

In accordance with the invention, the centerline of bi-directional horn 62, FIG. 8, is disposed at an acute angle $\theta$ to the surface 106 of upper most ply 100. Preferably, an angle $\theta$ of under 45° is used and surprisingly good results have been obtained with an angle $\theta$ of approximately 30°. As opposed to a perpendicularly oriented horn, the angled horn vibrations occur, as indicated by arrow 107, longitudinally, generally parallel to the longitudinal axis of horn 62. But, in this case, the shear waves of vibrations induced in the material, namely plies 100 and 102 are generally parallel with the surface 106 of laminate 99 but also propagate perpendicular to surface 106. The vibration of horn 62 of bi-directional device 60 sets up shear in plies 100 and 102 in a direction generally parallel to surface 106 as indicated by arrows 122. With this orientation, tests have shown that the heating and consolidation are substantially superior to the prior art.

It is important that round face 66 of horn 62 remains in intimate contact with the composite material. The force behind this contact is a controlling variable relating to the successful operation of ultrasonic device. The force should be applied at or near a prescribed location along the ultrasonic device so as not to adversely affect the desired ultrasonic vibrations. The component of the ultrasonic device to which the force is routinely applied may be specially designed and is commonly located between and rigidly attached to the horn and the transducer. This component, conventionally referred to as a booster, is in turn mounted in a force insensitive manner so as to isolate the ultrasonic device from any surrounding fixture(s). Although other ways of applying contact forces are also used, the force may be applied as follows: force application device 110 contacts booster 111. Force application device 110 may be a spring, an electrically driven solenoid or motor driven electromechanical device. Hydraulic and pneumatic actuators have also been used.

In operation, bi-directional 60 may be drawn along to the right as shown by arrow 84, FIG. 9 to perform continuous consolidation such as is required in filament/winding or tape/laying operations in the fabrication of composites structures. Because bi-directional device 60 includes horn 62 with unique rounded face 66 contacting top surface 88 of fiber reinforced composite structure 82, it provides efficient and effective bi-directional consolidation because the direction of the lamination process can be easily reversed without damaging the composite structure. If bi-directional device 60 is driven to the left as shown by arrow 90, FIG. 10 while constant contact is maintained with top surface 88, rounded face 66 facilities changes in direction without digging in or gouging the fiber reinforced composite structure.

Further, rounded face 66 of horn 62 provides constant contact area over a wide range of horn angles, ranging from 5° to 85°. Moreover, the rounded tip horn provides more equalized introduction of ultrasonic energy which reduces hot spots.

The unique design of horn 62, with rounded face 66 provides for bi-directional consolidation of fiber reinforced composite structures which is faster, more efficient, and more flexible than prior art square flat faced ultrasonic horns. The unique rounded face which contacts the composite structure provides more even heat distribution resulting in superior consolidation of a fiber reinforced composite structure. The reduction of hot spots in the horn and the processed material also increases the quality and efficiency of consolidating the fiber reinforced composite structure.

In sharp contrast, prior art ultrasonic horn 10, FIG. 1 with square flat face 16 and sharp edge 18 cannot perform bi-directional consolidation. Further, the square wedge like design of the prior art horn creates an intense energy focus that results in hot spots which can significantly damage to the composite and result in as production delays during in the processing of the composite.

Device 60, FIG. 8 can be used to consolidate and debulk plies of a thermosetting matrix, fiber reinforced composite structure. For example plies 100, 102, and 104 to be consolidated and debulked are generally placed on mandrel 43 as shown. In operation, device 60 may be drawn along to the right and/or driven to the left, to perform continuous consolidation such as is required in a filament-winding or tape-laying operations in the fabrication of thermosetting composites. Transducer 110 can be operated at 40 kHz, although other frequencies may be used. Horn 62 may be pushed and/or pulled across the top surface of the uppermost ply or the horn held stationary and the stack of plies moved to the left and/or right.

In another embodiment of the subject invention, horn 200, FIG. 11, does not include converging sides and, instead, body 202 terminates in rounded face 204 at distal end 205. In yet another embodiment of the subject invention, horn 220, FIG. 12 includes face 224 which has non-rounded portion 222 in addition to rounded portion 226. Such a design is not symmetrical, but still rounded portion 226 is the portion of face 224 which contracts the ply being consolidated.

Figure 13:
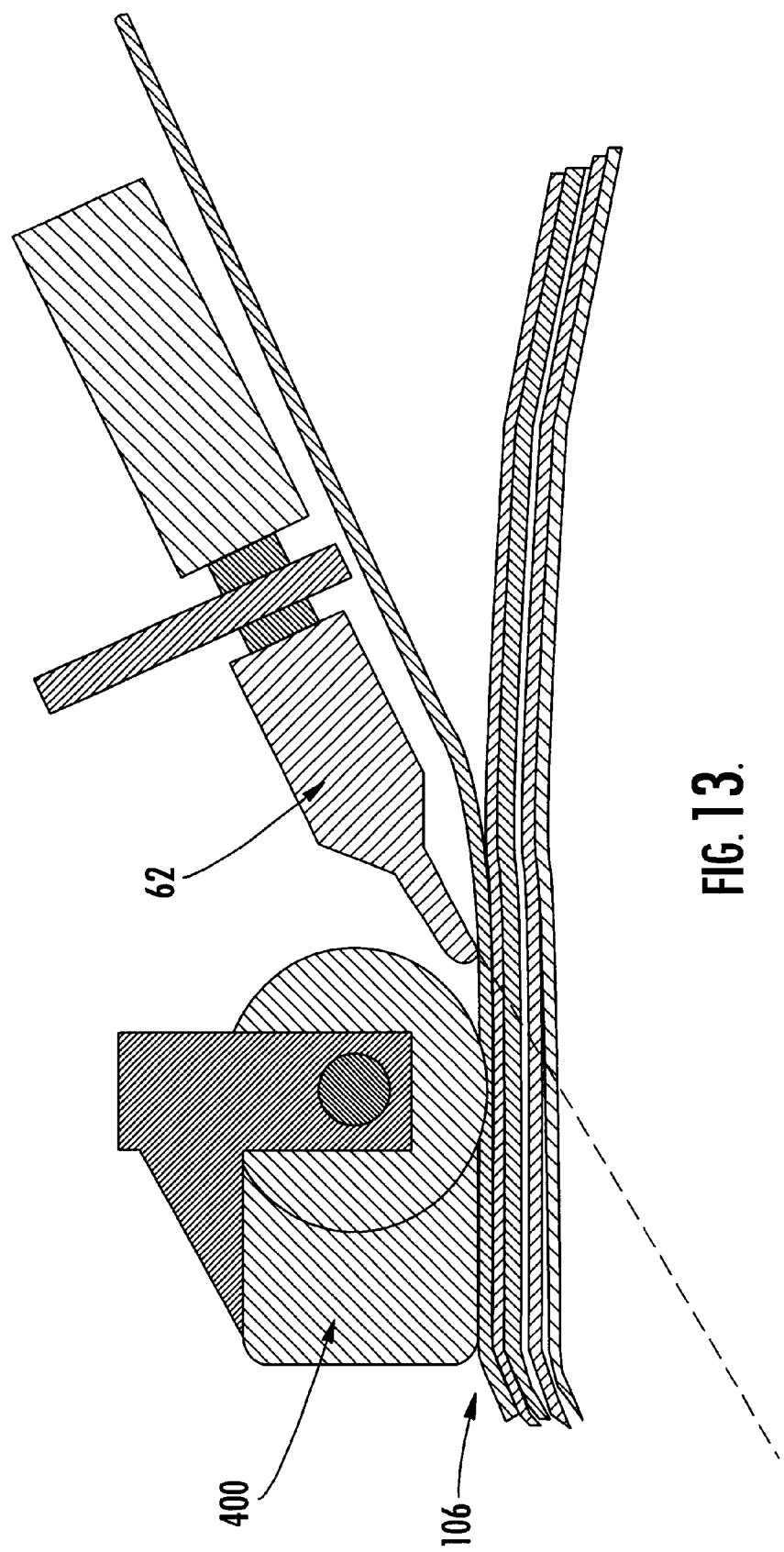
FIG. 13 is a view similar to FIG. 8 but with the consolidation force applied by a separate pressure shoe.

In any design, the pressure or force required for debulking and consolidation (or to prevent deconsolidation prior to cooling) may also be applied by a separate member, such as a shoe or roller 400, FIG. 13 which is disposed proximate horn 62. If horn 62 is moving across surface 106, then shoe 400 extends the period of time when the consolidation force is applied over the situation when the consolidation force is applied only by the horn itself.

In all embodiments, the fiber reinforcement direction of each ply may be in the same direction in each ply but typically is not. The fibers may be disposed in an orderly array, they may be random, they may be woven or unidirectional, they may be made of various materials such as glass, carbon, aramid or ceramic substances. The resin matrix may be either a thermosetting material or a thermoplastic material. For a thermoplastic resin based material, the consolidation action can be completed using the application of ultrasonic energy and pressure. For a thermosetting material, the ultrasonic energy is used only to soften the material and bring it to a tacky condition. For full setting, the thermosetting material must typically be subjected to a secondary heating source for a period of time to cure.

As delineated in the Background of the Invention above, consolidation of plies of fiber reinforced thermosetting materials in the prior art generally requires forming a lay-up of several plies, using hot gasses to tack the plies together, placing this lay-up in a vacuum bag and then using an oven or autoclave to debulk the plies and to at least partially consolidate the plies. More plies are then added to the lay-up and the autoclave used again to debulk and at least partially consolidate those plies.

The increased temperature induced by the autoclave lowers the viscosity of the thermosetting resin causing flow. The vacuum and increased pressure induced by the autoclave debulks the plies eliminating any voids or entrapped air between plies. The overall purpose is to insure the part geometry and thickness are close to the final cure thus preventing occurrence of fiber deformations, wrinkles or waviness in the cured part.

The prior art process, e.g. hot gas placement with intermediate debulking and final autoclave cure, is costly and time consuming. Morever, autoclaves are expensive and even the largest commercially available autoclave cannot accommodate some composite parts made of fiber reinforced thermosetting materials because of their size and shape.

In the prior art it is desirable for the tape placement process not to advance the resin cure significantly. This is because resin flow is needed later to consolidate the part in the autoclave. However, the ability of the resin to flow under autoclave pressure imposes a requirement for expensive tooling to maintain the desired part geometry during cure. The cost of this expensive tooling can add significantly to the cost of the resultant product particularly for small production runs.

Moreover, the precise temperatures and pressures employed in the autoclave vary from lay-up to lay-up and from part to part, often requiring some experimentation before proper debulking and consolidation is achieved.

By utilizing the bi-directional ultrasonic horn of the subject invention, the repeated lay-up and debulking-steps of the prior art methods are eliminated. Instead, the adjacent plies are debulked at least partially or even fully as the plies are laid down. The results is at least partial elimination of the time and cost associated with prior art composite part debulking methods. Further, vibration induced fiber nesting can enhance interlaminar properties. Expensive tooling is sometimes not required to keep the lay-up in its desired shape during the final oven cure. Hot gasses are also generally not required significantly lowering the cost of the resultant part or product.

Additionally, the ultrasonic head may not only consolidate the plies to near net-shape, it can also advance the cure sufficiently so that the completed lay-up can be cured with minimal tooling in an oven instead of an autoclave using a process known as solid state curing. Expensive tooling is generally not required to keep the lay-up in its desired shape during the final oven cure.

A net-shaped or near net-shaped part and debulking of each ply to adjacent plies is accomplished in accordance with this invention by orienting the rounded face of the ultrasonic horn at an angle on the top most ply to be consolidated to the lay-up and energizing the horn to induce a shear wave in the plies which is not dissipated by the fibers in the plies and which heats the thermosetting resin to lower its viscosity via a shear force induced in the plies. The energy level of the shear wave is chosen so that it sufficiently reduces the viscosity of the thermosetting resin to the point where the plies can be debulked by the pressure applied to the stack of the plies via the ultrasonic horn itself and/or a roller which follows the horn as it moves over the plies. The energy level of the shear wave, however, is lower than a level which would cause full chemical cross-linking of the thermosetting resin to therefore allow another ply to be laid down and chemically cross-linked to the ply or plies below it. In this way, the plies are debulked and at least partially consolidated as each ply is laid down reducing or eliminating the need for repeated autoclaving, expensive tooling, and the use of hot gases.

Figure 14:
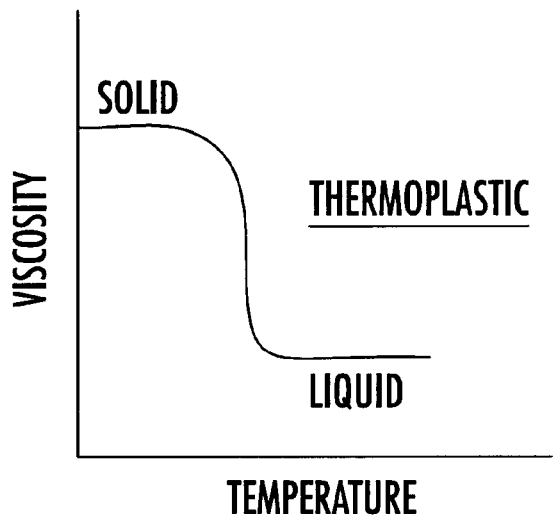
FIG. 14 is a graph showing the relationship between viscosity and temperature for a thermoplastic material used as the resin in one type of a fiber reinforced composite ply or structure used in the subject invention.
Figure 15:
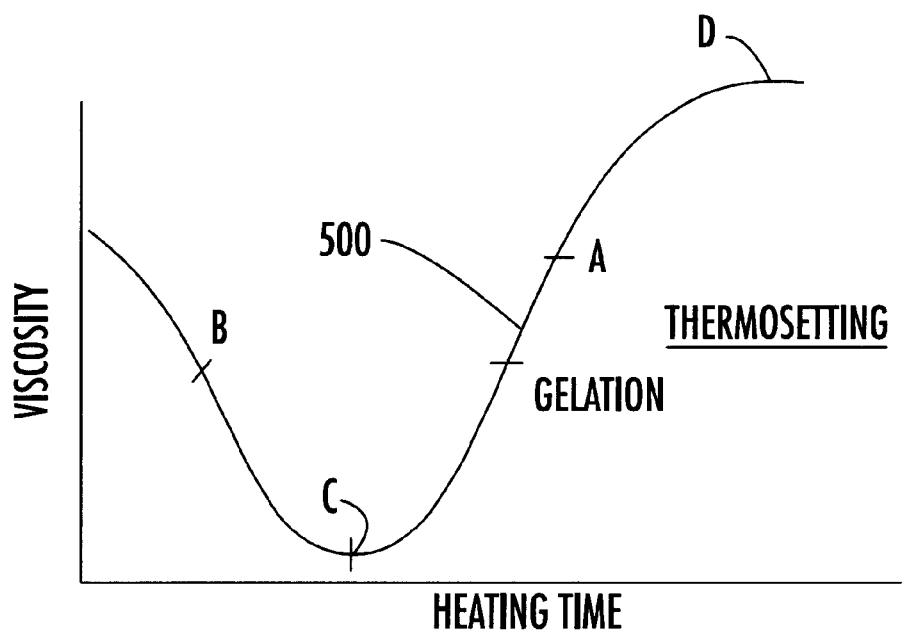
FIG. 15 is a graph showing the relationship between viscosity and temperature for a thermosetting material used as the resin in one type of a fiber reinforced composite ply or structure also used in accordance with the subject invention.

As shown in FIG. 14 cross linking during fluidization is not a concern in thermoplastic composite materials since the thermoplastic matrix undergoes a reversible transition from a solid to a liquid at a predetermined temperature. In thermosetting materials, in contrast, FIG. 15, the viscosity of the resin is dependent on both temperature and time and cannot again be lowered after cross linking of the resin molecules sometime after point A on curve 500. The exothermic reaction is generally understood to begin at about point C. Gellation occurs somewhere near point A. At point D, the resin is fully cured. Debulking is possible between points B and A but as A is approached the ability of the debulked plies to re-flow during subsequent processing steps is inhibited. This can be a problem if the intermediate debulking achieves only partial consolidation and further consolidation is desired during final cure.

Thus, the ultrasonic horn should be energized to a level such that debulking of the plies is possible but not too high such that another ply can still be laid down and its resin cross linked to the thermosetting resin of the ply or plies below. Although the preferred energy level results in a thermosetting resin viscosity between points B and A, it may be desirable to energize the horn at energy levels resulting in viscosity closer to B or closer to A depending on the overall process sequence. For example, if the goal is to eliminate a portion of the intermediate debulks but retain the autoclave for final cure, then a viscosity closer to B, which results in partial consolidation would be sufficient. In contrast, if the goal is to fully consolidate the part and stabilize the geometry to permit solid state curing in an oven, then a viscosity closer to point A is desirable. Depending on the size, configuration, number of plies, and end use of the composite, ultrasonics may be employed simply to reduce the number of intermediate debulks. In other cases, net-shaped fully debulked and consolidated parts suitable for solid state curing in an oven result from the methodology of the subject invention. These different resin states can be achieved by varying the advance rate of the head and the power (vibration amplitude and/or pressure) of the ultrasonic horn. In this way, the invented process provides controlled staging and selected levels of cure advancement.

The ultrasonic tape lamination process utilizing the bi-directional device of this invention can result in high strength fully debulked and cured composite parts made of thermosetting resin, fiber reinforced plies without the use of an autoclave at either the debulking or curing stages. In the prior art, debulking was accomplished with repeated vacuum bag or autoclaving operations and curing was accomplished in an autoclave. Utilizing the bi-directional device of the subject invention, debulking occurs on the fly as the plies are laid down and curing is accomplished by an autoclave, an oven cure, or by the action of the ultrasonic horn as the plies are laid down.

Figure 16:
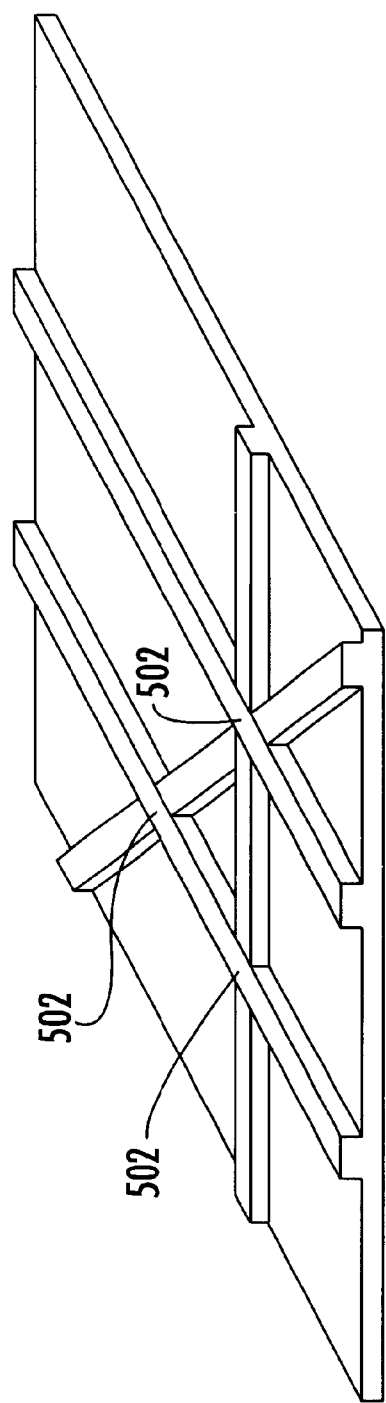
FIG. 16 is a partial schematic view of a composite isogrid component which can be fabricated using the bi-directional device of the subject invention.
Figure 17:
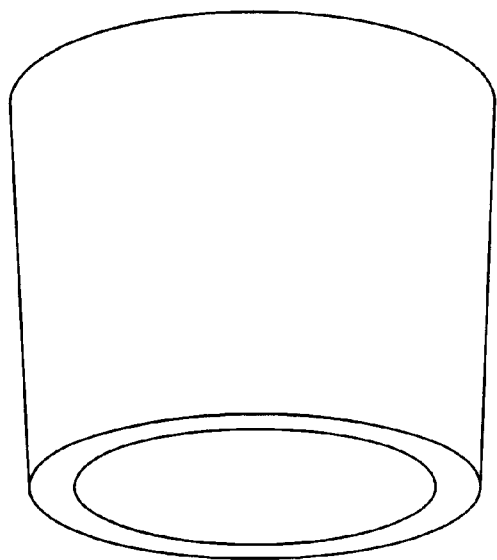
FIG. 17 is a schematic view of a cylindrical structure which can be fabricated using the bi-directional device of the subject invention.

A robotic fiber placement machine, which normally employs hot gasses for heating and repeated autoclaving or vacuum bag processing for debulking, can be modified to include an ultrasonic horn with a rounded face disposed at an angle to the laminate surface which debulks the plies of the laminate as they are laid down eliminating the need for repeated debulking operations. Such a modified robotic fiber placement machine can be used to fabricate a composite isogrid panel of the geometry shown in FIG. 16. Consolidation of the stiffener intersections 502 (nodes) using hot gas was previously problematic. The isogrid panel fabrication can result in accurate and precise tow placement to achieve the unidirectional ply buildups that form the stiffener ribs. High levels of consolidation can be achieved at the nodes. Thus, the ultrasonic tape lamination process of the utilizing rounded horn of the subject invention is suitable for large scale manufacturing processes. In the subject invention, the ultrasonic horn may be energized only as the plies being laid down approach a node resulting in consolidation at the nodes. Thus, controlled consolidation action can be achieved by the method of the subject invention in sharp contrast with hot gas prior art methods which are not controllable since the hot gas cannot be turned on and off as rapidly as an ultrasonic horn can be energized and de-energized. FIG. 17 shows a cylindrical structure which can be manufactured using the bi-directional device of the subject invention. Many (70–100) plies can be laid down on a mandrel. In the prior art using hot gasses, numerous debulking operations were required using a vacuum bag and an autoclave as the plies were built up. Moreover, after inspection, the ply added after a debulking operation was not entirely consolidated to the previous plies and ply striations were noted.

In contrast, in the subject invention, significantly less debulking operations and better consolidation can be achieved. Moreover, because of the vibratory action of the ultrasonic horn, the next ply laid down after a debulking is often fully consolidated to the previous ply and no striations will occur. Instead, the action of the ultrasonic horn causes enhanced fiber nesting between plies.

As stated above, traditional repeated vacuum bag and oven or autoclave debulking operations are either reduced or eliminated in utilizing the bi-directional device in accordance with the subject invention. Striations between debulking operations are reduced or eliminated, and a much higher level of control is possible as the plies are debulked. The final cure can be effected in an autoclave, an oven, or through the use of the ultrasonic horn in accordance with this invention.

The bi-directional device for ultrasonically consolidating a fiber reinforced composite structure of the subject invention provides efficient and effective bi-directional consolidation of a fiber reinforced composite structure. The unique design of ultrasonic horn which includes a rounded face provides for bi-directionally consolidation of fiber reinforced composite structure which is faster, more efficient, and more flexible than prior art square flat faced ultrasonic horns. The rounded face of the horn prevents gauging and damage the surface of the laminate when bi-directional lamination of a composite structure is performed. Further, the rounded face of the bi-directional device provides even distribution which increases the quality and efficiency of consolidating thermosetting or thermoplastic matrix fiber reinforced composite structures.

Although specific features of the invention are shown in some drawings and not in others, this is for convenience only as each feature may be combined with any or all of the other features in accordance with the invention.

Other embodiments will occur to those skilled in the art and are within the following claims:

1. A bi-directional device for ultrasonically consolidating a fiber reinforced composite structure, the device comprising:
   a horn which can be angled relative to the composite structure; and
   a tip at the distal end of the horn, the tip terminating in a rounded face which contacts the composite structure enabling the horn to be driven bi-directionally over the composite structure at an angle.

2. The bi-directional device of claim 1 in which the horn is a step horn.

3. The bi-directional device of claim 1 in which the horn is an exponential horn.

4. The bi-directional device of claim 1 in which the horn is a catenoidal horn.

5. The bi-directional device of claim 1 in which the horn is a rectangular horn.

6. The bi-directional device of claim 1 in which the tip includes sides which converge toward the rounded face.

7. The bi-directional device of claim 6 in which the sides converge at an angle of between 10° and 40°.

8. The bi-directional device of claim 1 in which the distal end of the tip is symmetrical.

9. The bi-directional device of claim 1 in the tip includes a non-rounded portion proximate the face on the distal end of the tip.

10. A method of fabricating a fiber reinforced composite structure, the method comprising:
   assembling a stack of fiber reinforced material plies;
   engaging an ultrasonic horn with a rounded face with a top surface of the upper most ply such that the rounded face contacts the upper most ply;
   orienting the horn at an acute angle with respect to the top surface;
   energizing the horn to induce a shear wave in the plies to heat the plies; and
   providing relative motion between the horn and the stack such that the horn can be driven and pulled over the upper most ply to consolidate the plies.

11. The method of claim 10 further including the step of applying a consolidation force to said plies.

12. The method of claim 11 in which said consolidation force is applied through said horn.

13. The method of claim 11 in which said consolidation force is applied proximate said horn by a roller.

14. The method of claim 10 in which said acute angle is less than or equal to 15 degrees.

15. The method of claim 10 in which said fiber matrix structure includes a thermoplastic polymer-matrix.

16. The method of claim 10 in which said fiber matrix structure includes a thermosetting polymer-matrix.

17. A method of fabricating a fiber reinforced composite structure, the method comprising:
   assembling a stack of fiber reinforced material plies;
   engaging an ultrasonic horn with a tip at the distal end of the horn, the tip terminating in a rounded face which contacts a top surface of the upper most ply, the rounded face enabling the horn to be driven bi-directionally over the top surface of the upper most ply;
   orienting the horn at an acute angle with respect to the top surface;
   energizing the horn to induce a shear wave in the plies to heat the plies; and
   driving the horn bi-directionally over the top surface to consolidate the plies.

18. The method of claim 17 further including the step of applying a consolidation force to said plies.

19. The method of claim 18 in which said consolidation force is applied through said horn.

20. The method of claim 18 in which said consolidation force is applied proximate said horn by a roller.

21. The method of claim 17 in which said acute angle is less than or equal to 15 degrees.

22. The method of claim 17 in which said fiber matrix structure includes a thermoplastic polymer-matrix.

23. The method of claim 17 in which said fiber matrix structure includes a thermosetting polymer-matrix.

24. A method of fabricating a thermosetting matrix fiber reinforced composite structure, the method comprising:
   assembling a stack of fiber reinforced thermosetting resin material plies;
   engaging an ultrasonic horn with a tip at the distal end of the horn, the tip terminating in a rounded face which contacts a top surface of the upper most ply, the rounded face enabling the horn to be driven bi-directionally over the top surface of the upper most ply;
   orienting the horn at an acute angle with respect to the top surface;
   energizing the horn to induce a shear wave in the plies to heat the plies;
   providing relative motion between the horn and the stack such that the horn is driven and pulled over the upper most ply to consolidate the plies, the energy level applied by the horn sufficient to reduce the viscosity of the thermosetting resin to the point where the plies can be debulked but not high enough to fully cross-link the resin so that another ply can be cross-linked to the uppermost ply; and
   applying pressure to the plies as the horn moves relative to the plies to debulk the plies.

25. The method of claim 24 in which the plies of thermosetting material comprises more than 40% fiber by volume.

26. The method of claim 24 further including the step of subjecting the stack of plies to an autoclave or oven cure.

27. The method of claim 24 in which one or more plies is deposited onto a previously assembled and consolidated stack of plies.

28. The method of claim 24 used in conjunction with filament winding, tape placement, fiber placement or tow placement or tow placement to deposit and consolidate thermosetting matrix, fiber reinforced composites.

* * * * *